(No Model.) 4 Sheets—Sheet 1.

G. MULLER.
CABLE TRACTION SYSTEM.

No. 481,413. Patented Aug. 23, 1892.

WITNESSES:

INVENTOR
G. Muller
BY
Munn & Co.
ATTORNEYS.

(No Model.) 4 Sheets—Sheet 2.
G. MULLER.
CABLE TRACTION SYSTEM.
No. 481,413. Patented Aug. 23, 1892.
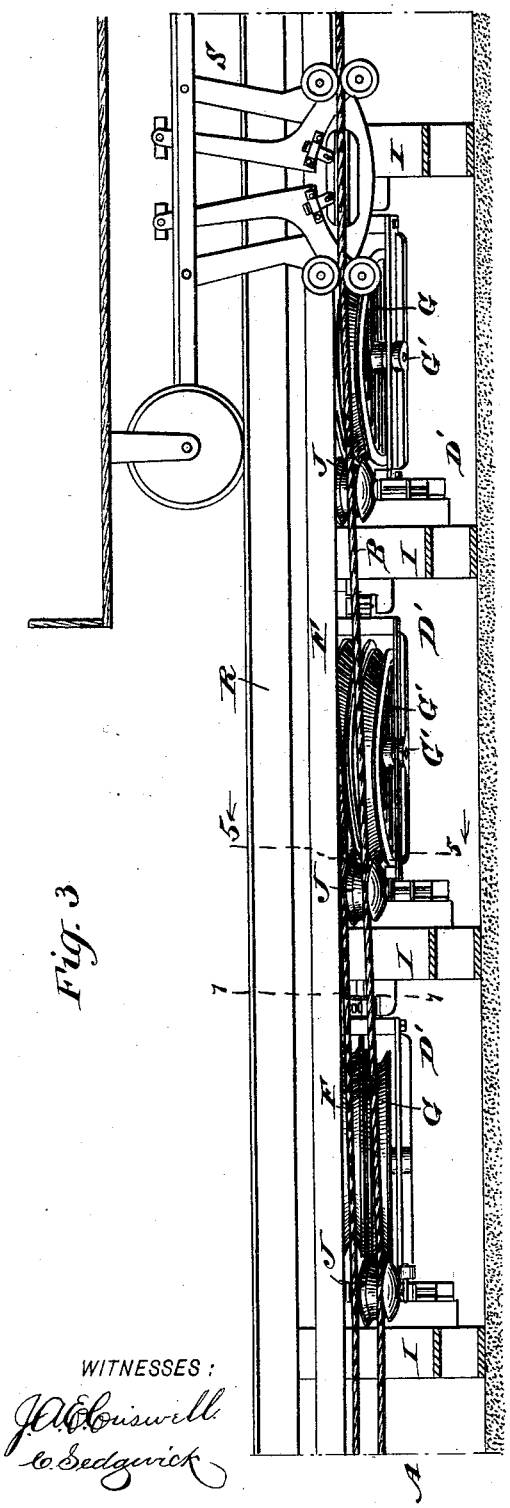
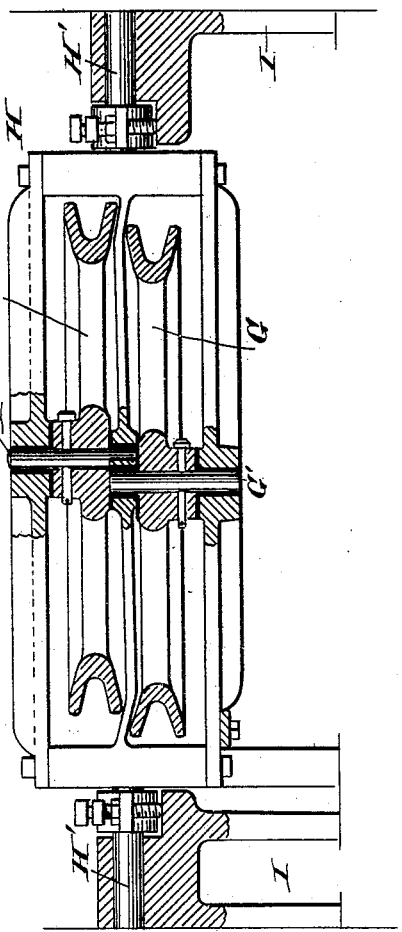
WITNESSES:
INVENTOR
G. Muller
BY
Munn & Co
ATTORNEYS.

(No Model.) 4 Sheets—Sheet 3.
G. MULLER.
CABLE TRACTION SYSTEM.

No. 481,413. Patented Aug. 23, 1892.

WITNESSES:
J. A. Criswell
C. Sedgwick

INVENTOR
G. Muller
BY
Munn & Co
ATTORNEYS.

(No Model.) 4 Sheets—Sheet 4.

G. MULLER.
CABLE TRACTION SYSTEM.

No. 481,413. Patented Aug. 23, 1892.

WITNESSES:

INVENTOR
G. Muller
BY Munn & Co
ATTORNEYS.

UNITED STATES PATENT OFFICE.

GEORGE MULLER, OF HOBOKEN, NEW JERSEY.

CABLE-TRACTION SYSTEM.

SPECIFICATION forming part of Letters Patent No. 481,413, dated August 23, 1892.

Application filed March 25, 1892. Serial No. 426,385. (No model.)

*To all whom it may concern:*

Be it known that I, GEORGE MULLER, of Hoboken, in the county of Hudson and State of New Jersey, have invented a new and Improved Cable-Traction System, of which the following is a full, clear, and exact description.

The invention relates to cable-traction systems, such as shown and described in the application for Letters Patent of the United States, Serial No. 409,177, filed by me on October 19, 1891, and allowed March 1, 1892.

The object of the present invention is to provide a new and improved cable-traction system arranged to permit the employment of two cables for each track and constructed to reduce the friction to a minimum, while at the same time the picked-up or dropped cable does not interfere with or come in contact with the other cable.

The invention consists principally of two sets of pulleys arranged on opposite sides of the cables on an S or similar curve, each set of pulleys comprising two pulleys, one for each cable, and mounted to turn in a yoke adapted to swing.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1:
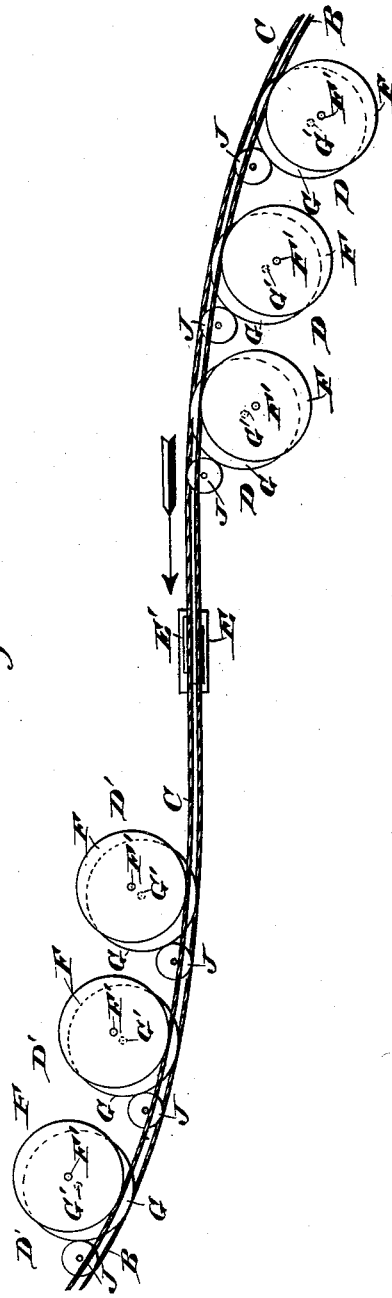
Figure 2:
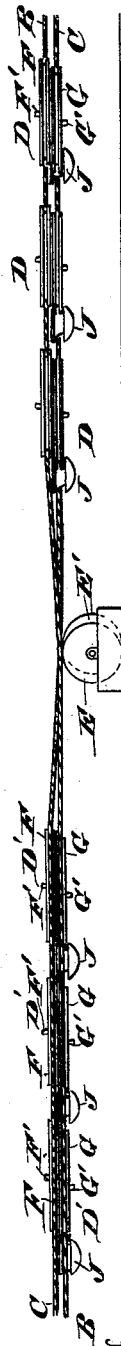
Figure 5:
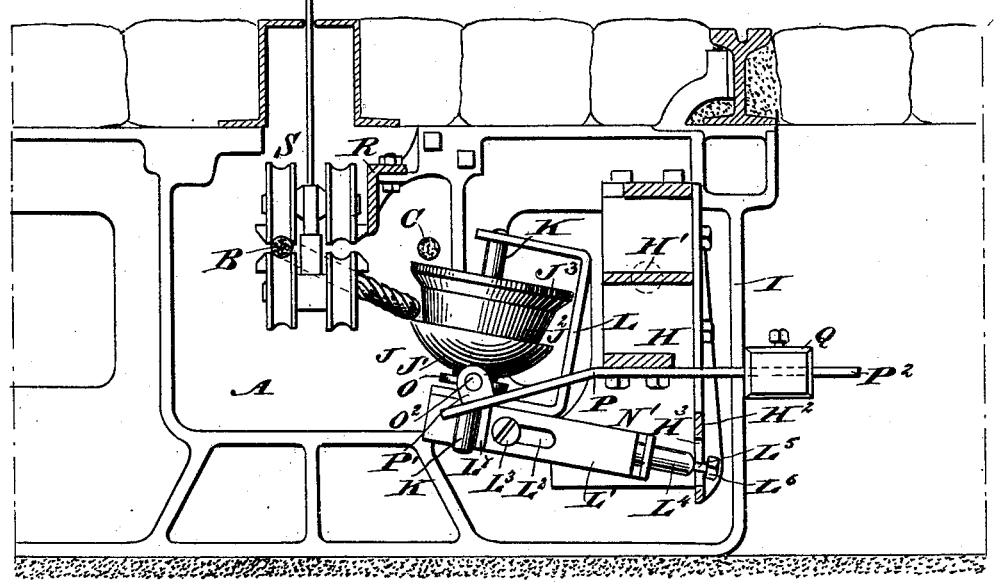
Figure 6:
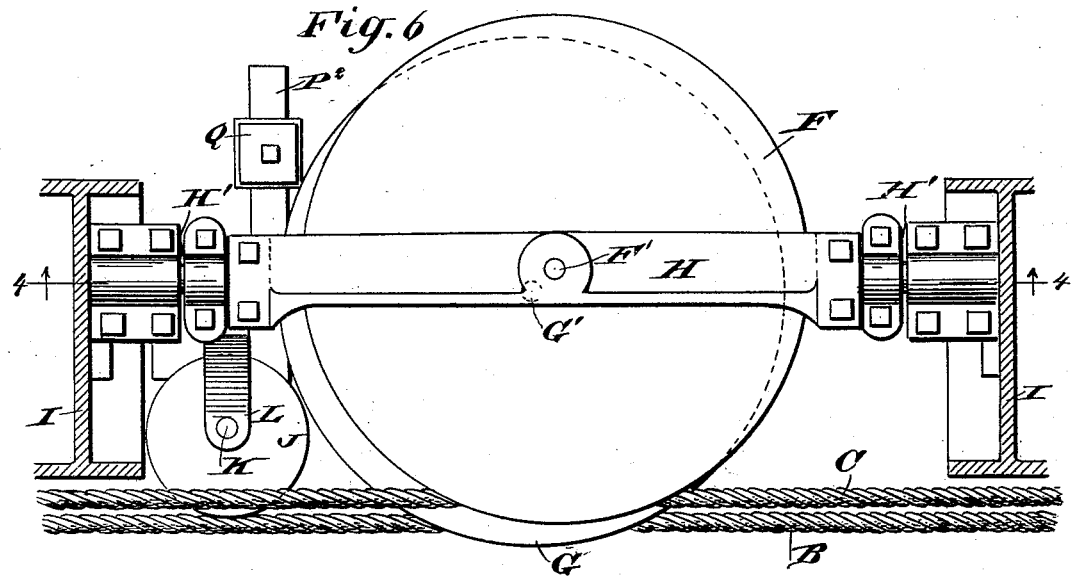
Figure 7:
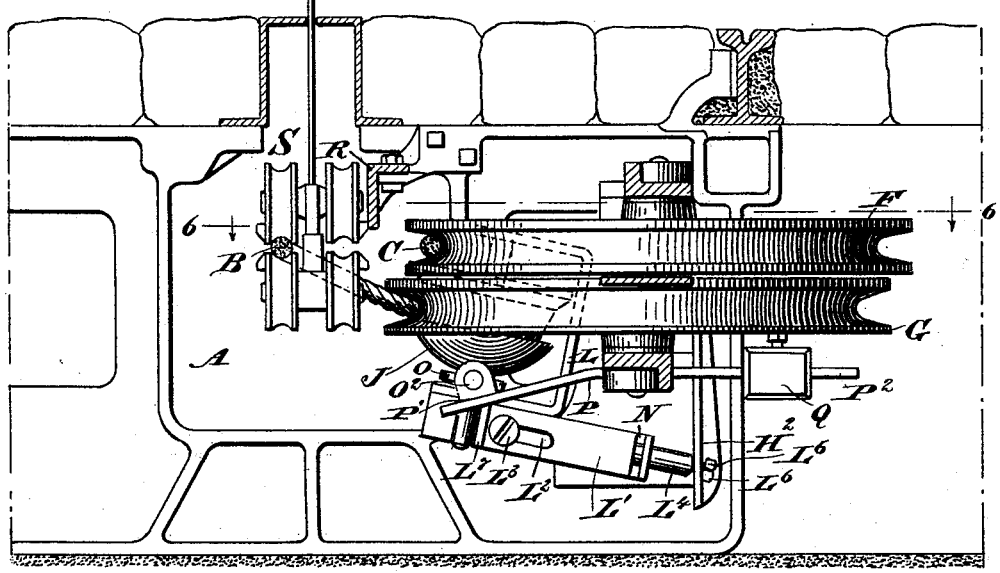
Figure 8:
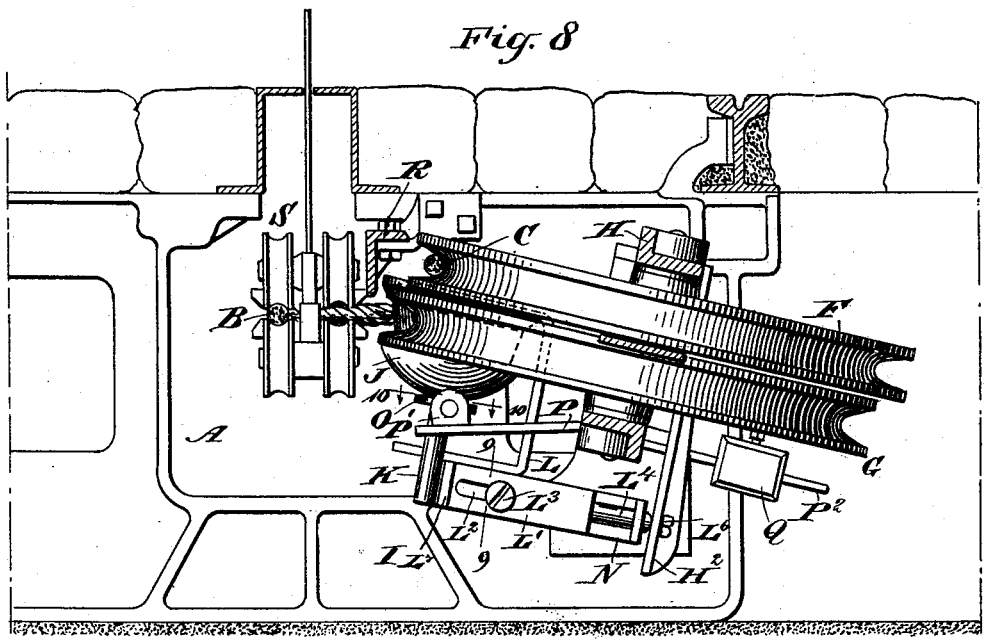

Figure 1 is a plan view of the improvement as applied on an S-curve. Fig. 2 is a side elevation of the same. Fig. 3 is an enlarged side elevation of the improvement, showing the device on the last half of an S-curve. Fig. 4 is an enlarged sectional side elevation of the yoke and pulleys on the line 4 4 of Fig. 6. Fig. 5 is an enlarged transverse section of the improvement on the line 5 5 of Fig. 3. Fig. 6 is an enlarged plan view of one set of pulleys and yoke on the line 6 6 of Fig. 7. Fig. 7 is an enlarged transverse section of the improvement on the line 7 7 of Fig. 3. Fig. 8 is a similar view of the same in a different position. Fig. 9 is a sectional side elevation of part of the improvement on the line 9 9 of Fig. 8, and Fig. 10 is a sectional plan view of part of the improvement on the line 10 10 of Fig. 8.

The cable road is provided with the usual conduit or duct A, in which extend the two cables B and C, arranged alongside each other in the straight part of the duct and located one above the other on entering curves, as illustrated in the drawings. On ordinary quarter-curves the two cables B and C remain in this relative position throughout the curve; but on an S-curve the position of the cables is reversed at or near the middle, so that the former lower cable becomes the upper one and the former upper one the lower one, as plainly shown in Figs. 1 and 2. The cables leave the S-curve in this position and are thus gradually again passed side by side on the straight track. On an S-curve, as shown in Figs. 1 and 2, the cables are thrown through one-half of the curve on one side of a set of supporting devices D, and during the remainder of the curve the cables are passed along and supported on a like set of supporting devices D', but on their opposite side. Between the adjacent two devices of the two sets D and D', the crossing or transposition of the two cables B and C takes place on pulleys E and E', respectively, placed alongside and disposed vertically, as plainly shown in the said Figs. 1 and 2. It is understood that the two cables B and C do not touch each other in either normal positions shown or when the grip passes through the S-curve on one of the said two cables B or C. On an ordinary quarter-curve the two cables pass along on one side of a set of devices D or D'. It is understood that the latter are all alike in construction. The number of devices in one set D or D' depends on the length of the curve, the number increasing for very long-stretched curves and decreasing for very short curves. Each independent device of the sets of supporting devices D or D' is provided with two grooved pulleys F and G, of which the pulley F is located on top of the pulley G and is secured on a shaft F', mounted to turn in a yoke H, provided at its sides with trunnions H', journaled in suitable bearings in the frame-work I of the conduit or duct A. The lower pulley G is provided with a shaft G', also mounted in the yoke H, but set somewhat in front and to one side of the shaft F', as plainly illustrated in the drawings, especially in reference to Figs. 4 and 6, so that the lower pulley extends a short distance to the front of the upper pulley F, as plainly shown in the drawings. The cable B in the set of devices D passes over the pulleys F, while in the set D' the said cable passes over the pulleys G. In a like manner the cable C passes over the pulleys G in the set of devices D and over the pulleys F in the set of devices D'.

In front of each set of pulleys F and G is arranged a pulley J, mounted to turn and to slide up and down on a shaft K, secured in a frame L, preferably made U-shaped and extending rearwardly, as shown. The pulley J is provided with a semi-spherical base J', from which extends upward an inverted cone-shaped part $J^2$, terminating in an inclined flange $J^3$, the top of which is located a short distance below the upper arm of the frame L, so as to permit the pulley J to slide upward on the shaft K until the said flange $J^3$ abuts against the upper arm of the frame. The small end of the part $J^2$ is somewhat less in diameter than the top of the base J', whereby a shoulder is formed on the said base for the cable to rest on. When the cables B and C are in their normal position, the upper cable passes over the top of the flange $J^3$, while the lower cable rests on the top of the base J' on the inclined part $J^2$. The bottom of the frame L is attached to a rearwardly-extending bar L', formed near its front end with a slot $L^2$, through which passes a set-screw $L^3$, screwing in a plate N, secured to the duct-frame I, and in it is mounted to slide a rod or pin $L^4$, projecting from the rear end of the bar L'. The pin $L^4$ is formed at its rear end with a reduced portion $L^5$, passing into and through a vertical slot $H^3$, formed in a plate $H^2$, attached by suitable means to the yoke H at one side thereof. A nut $L^6$ screws on the reduced part $L^5$ of the pin $L^4$, so as to hold the said pin in place on the arm $H^2$.

On the front end of the bar L' is formed a shoulder $L^7$, on which abuts the lower end of the shaft K, as will be readily understood by reference to the drawings. The base J' of the pulley J rests on top of a link O, through the elongated opening O' of which passes loosely the lower part of the shaft K. (See Fig. 10.) From one side of the link O projects a pivot-pin $O^2$, fitted in a bearing P', secured on an arm P, extending transversely and attached to the yoke H a suitable distance below the trunnions H', as illustrated in Fig. 5. The arm P is formed with a rearward extension $P^2$, on which is held adjustable a weight Q, serving to counterbalance the yoke and its several parts to hold the pulleys in the proper position.

In the front of the uppermost pulleys F is arranged a guard-rail R, secured to the framework I of the conduit or duct A, the lower edge of this guard-rail being in line with the top flange of the pulley F when the latter is in a normal position, as shown in Fig. 7. The guard-rail R extends longitudinally throughout the length of the curve and is arranged to permit an upward swinging of the pulleys, as will be readily understood by reference to Fig. 8.

The cables B and C are adapted to be engaged by a grip S, of any approved construction, preferably, however, of the construction shown and described in the Letters Patent of the United States, No. 352,255, granted to me on November 9, 1886.

The operation is as follows: When the car enters an S-curve and the grip S engages the then uppermost cable B, the said grip moves the cable out of the groove of the pulley F in front of the grip as the said grip approaches this pulley. As the pulleys F and G of each set stand in a horizontal position and remain therein, the cable is readily passed back into the groove of the pulley F after the grip has passed the respective set of pulleys. When the grip passes from the set of supporting devices D to the other set of supporting devices D', then the cable B, which is now in the lowermost pulleys G, is moved out of the groove of the first pulley G ahead of the grip, and in so doing the cable exerts an upward pull on the upper flange of the grooved pulley G, the gripping-jaws of the grip being located a suitable distance above the pulley G, as will be readily understood by reference to the drawings. In pulling upward on the pulley G the yoke H, carrying the pulleys F and G, is tilted, so that the front parts of the pulleys swing upward to assume the position shown in Fig. 8 and at the same time the connection between the yoke H and the advance pulley J causes the latter to slide upward on its shaft K, held in the frame L. It will be seen that by this movement of the pulley J and the tilting of the yoke H the said pulley is also moved outward in advance of the pulleys F and G and at the same time the cable is held off the pulleys G and J and the upper cable C is prevented from passing down onto the cable B. This upward and outward moving of the pulley J is due to the movement of the bar L' on the plate N, caused by the arm P tilting with the yoke H, to which it is rigidly secured. As soon as the grip S has passed the set of pulleys, the cable rests and presses rearward and downward on the top of the base J' of the pulley J, so that the rearward and downward motion of the said pulley is transmitted to the bar L' and also to the arm P, as the pulley rests on the link O, pivoted to the bearing P' of the said arm P. Thus the weight of the cable causes a return movement of the advance pulley J, and the latter by the connection above described causes a return movement of the yoke H, so that the pulleys F and G again assume a horizontal position, as shown in Fig. 7. It will be seen by reference to Fig. 3 that when the grip S passes onto the second half of the S-curve the first set of pulleys F and G is first acted on in the manner above described and at the same time the second set begins to swing upward at the front, and as soon as the grip passes between the first and second sets of pulleys F and G the third set is acted on by the upward movement of the cable held in the jaws of the grip S. Thus it will be seen that the advance pulley J serves to return the entire yoke and the pulleys F and G to the normal position after the grip has left the set of pulleys. If this arrangement was not made the yoke H would remain in a tilted position, so that the uppermost cable C could not be used, as the guard-rail R would not permit the cable to slide out from underneath the said guard-rail, as will be readily understood by reference to Fig. 8. It is to be understood that when the pulleys F and G return to their normal horizontal position the cable passes back into the groove of the pulley G and the strain is taken off entirely from the advance pulley J, as the latter resumes its lowermost position.

Having thus fully described my invention, I claim as new and desire to secure by Letters Patent—

1. A cable-traction system provided with two sets of pulleys D and D', arranged on opposite sides of the cables, each set comprising two pulleys, one for each cable, the cables crossing each other between the sets of pulleys D and D', so that the cable which was uppermost in one set of pulleys becomes lowermost on the other set of pulleys, and a yoke carrying the said pulleys and adapted to be tilted, substantially as shown and described.

2. In a cable-traction system, a cable-supporting device for two cables and comprising two pulleys located one above the other, a yoke carrying the said pulleys and mounted to swing upward by the action of the lowermost cable on the lowermost pulley, and an advance pulley journaled on the said yoke and engaged by the said lowermost cable to return the yoke to its normal position, substantially as shown and described.

3. In a cable-traction system, the combination, with a yoke mounted to tilt, of two pulleys journaled in the said yoke and one located above the other and an advance pulley supported on the said yoke and located in advance of the two other pulleys, substantially as shown and described.

4. In a cable-traction system, the combination, with a tilting yoke and two pulleys journaled therein, of an advance pulley supported by the said yoke and mounted to turn and to slide up and down, substantially as shown and described.

5. In a cable-traction system, the combination, with a tilting yoke and two pulleys journaled therein, of an advance pulley supported by the said yoke and mounted to turn and to slide up and down, the said advance pulley being also adapted to move forwardly while sliding upward, substantially as shown and described.

6. In a cable-traction system, an advance pulley provided with a spherical base, an inclined part extending from the said base, and a flange on top of the inclined part, substantially as shown and described.

7. In a cable-traction system, the combination, with a counterbalanced yoke mounted to tilt, of two pulleys journaled in the said yoke, one above the other and one in front of the other, an advance pulley mounted to turn adapted to slide up and down and to shift transversely, and means, substantially as described, for imparting the said movement to the advance pulley, as set forth.

8. In a cable-traction system, the combination, with a counterbalanced yoke mounted to tilt, of two pulleys mounted in the said yoke, one above the other and one in front of the other, an advance pulley mounted to turn, adapted to slide up and down and to shift transversely, a shaft secured in a frame and on which the said advance pulley is mounted to turn, an arm held on the said tilting yoke and pivotally connected with a link supporting the said advance pulley, and a fixed plate on which a bar of the said advance-pulley frame is mounted to slide, substantially as shown and described.

GEORGE MULLER.

Witnesses:
 THEO. G. HOSTER,
 E. M. CLARK.